(No Model.)
J. W. HYATT.
FILTER.
No. 354,143. Patented Dec. 14, 1886.
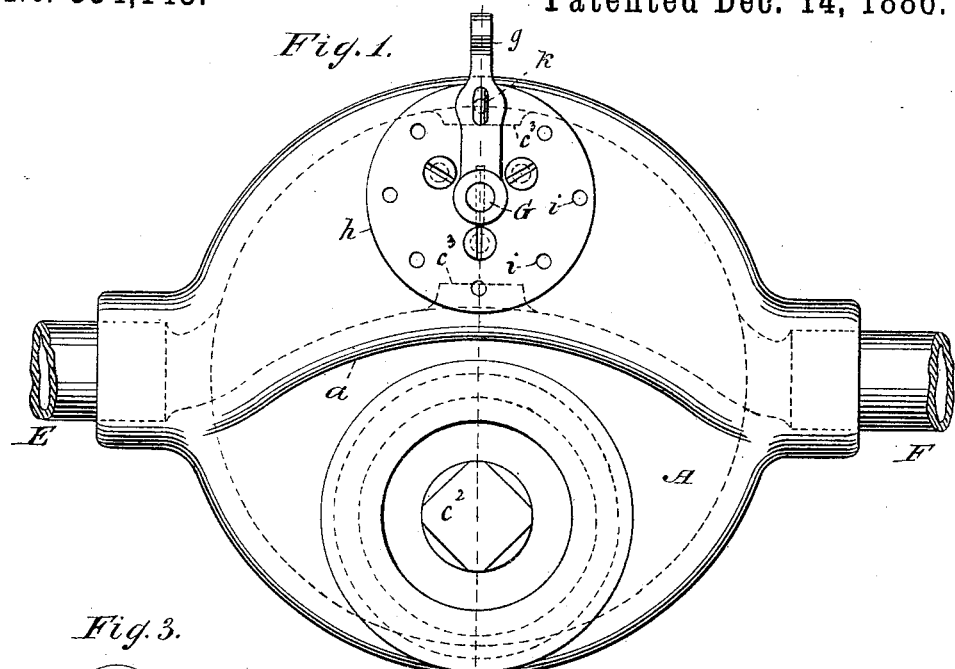
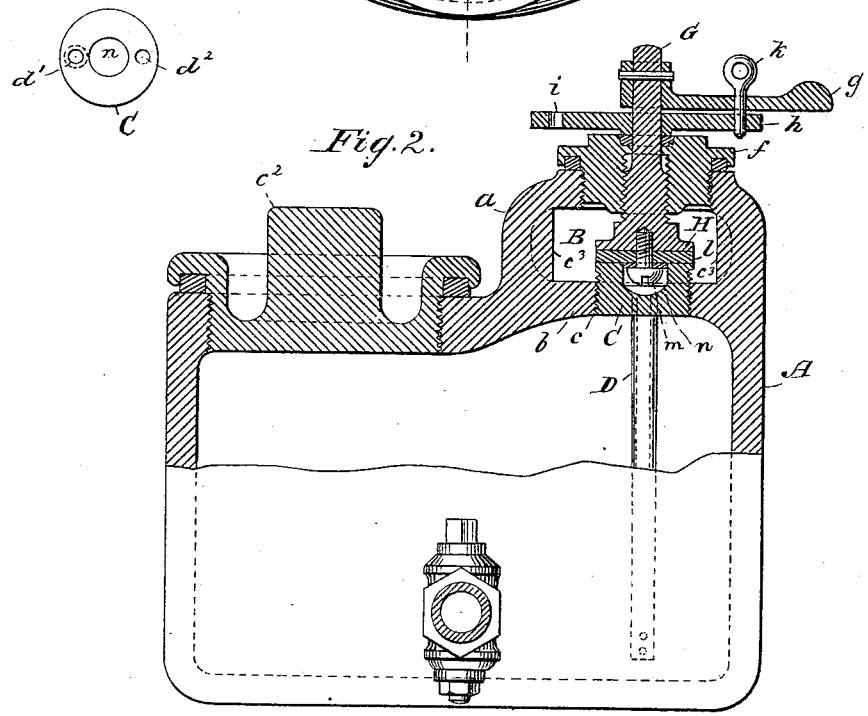
WITNESSES:
Edward Wolff
George Cook
INVENTOR
John W. Hyatt
BY Rowland Cox
his ATTORNEY

UNITED STATES PATENT OFFICE.

JOHN W. HYATT, OF NEWARK, NEW JERSEY.

FILTER.

SPECIFICATION forming part of Letters Patent No. 354,143, dated December 14, 1886.

Application filed September 7, 1885. Renewed November 11, 1886. Serial No. 218,661. (No model.) Patented in England July 14, 1885, No. 8,527; in France July 14, 1885, No. 170,116; in Belgium July 14, 1885, No. 69,590, and in Italy July 14, 1885, No. 18,667.

*To all whom it may concern:*

Be it known that I, JOHN W. HYATT, a citizen of the United States, and a resident of Newark, in the county of Essex and State of New Jersey, have invented certain new and useful Improvements in Filters, of which the following is a specification.

My invention relates to improvements in apparatus for filtering and purifying water, the object of the same being to provide a suitable receptacle for containing the coagulating material, whereby all the impurities contained in the water flowing from the supply-pipe into the filter will be coagulated, and all danger of such impurities passing through the filter-bed without being arrested thereby obviated.

A further object of my invention is to provide a device for containing a suitable coagulant so constructed that the quantity of water acting on the coagulant may be easily and readily regulated, and, further, to provide a device of this character which shall combine simplicity and economy of construction with durability and efficiency in use.

With these ends in view my invention consists of a receptacle for containing the coagulant, and constructed with a channel or passage for the water flowing through the supply-pipe, to which latter the receptacle is connected, said receptacle being provided with suitable valves, whereby the water flowing through the passage or any portion thereof may be turned down into the lower portion of the receptacle containing the coagulant, and thence allowing it to pass into the filter.

My invention further consists in certain novel features of construction and combinations of parts, as will be hereinafter fully described, and specifically pointed out in the claims.

In the accompanying drawings, Figure 1 is a top plan view of my improvement. Fig. 2 is a vertical sectional view thereof. Fig. 3 is a top plan view of the nut, forming a valve-seat and adapted to afford communication between the upper and lower portion of the receptacle.

Referring to the drawings, A represents the body of the receptacle, adapted to contain the coagulating material, and constructed with the vertical and horizontal walls $a\, b$, forming the channel or passage B, the water passing through the supply-pipe. This passage or chamber occupies one side of the upper portion of the body of the receptacle A, the wall of said receptacle forming the other vertical wall of said chamber. In the wall or floor $b$ is formed an opening, $c$, into which is screwed a nut, C, provided with an opening, $d'$, in which is fastened the upper end of a pipe, D, the lower end of the latter extending within a short distance of the bottom of the receptacle, and having its lower portion perforated, as shown in Fig. 2 of the drawings. The nut is also formed with a second passage or opening, $d''$, leading into the lower portion of the receptacle.

The sides of the passage or chamber B opposite the opening $c$ are formed with the inwardly-projecting ribs or flanges $c'''$, for the purpose of narrowing the passage at that point and causing the greater quantity of water to pass directly over the opening, the ends of said passage being provided with outwardly-extending ears, forming a continuation of said passage or channel, and into one of which is secured the end of the inlet or supply pipe E, into the other of which is secured one end of the outlet-pipe F, adapted to convey the water from the receptacle to the filter, the said pipe E, chamber B, and pipe F practically forming one continuous pipe to the filter.

In the top of the receptacle A, and directly over the nut C, is formed a screw-threaded opening, in which is fitted a nut, $f$, the latter being provided with a vertical central opening, through which passes the valve-rod G. On the lower end of this rod is formed a valve, H, and to the upper end thereof is rigidly secured the lever $g$, by turning which it will be readily seen that the valve-stem, which is secured thereto in the nut $f$, may be raised or lowered. To lock this stem and valve in its different adjustments, I secure to the nut $f$, by means of screws, the plate or disk $h$, provided near its outer edge with small holes or openings $i$, adapted to register with a similar opening formed in the lever $g$. After the stem and valve have been raised or lowered to their desired position the pin $k$ is passed into the opening formed in the said lever and into an opening, $i$, formed in the disk $h$, and registering with the opening formed in the lever, thereby securing the lever against further rotation and maintaining the valve at the proper point of adjustment. To the lower end of this valve is secured suitable packing, $l$, by means of the screw $m$, a depression or recess, $n$, being formed in the upper part of the nut C for the reception of the screw-head, as shown in Fig. 2 of the drawings.

It will be readily seen that by lowering the valve H upon the nut C, which forms a seat therefor, the openings, $d'$ $d''$, formed therein will be closed and the water prevented from entering the lower portion of the receptacle, thereby causing the whole quantity of water to pass directly through the chamber B into the filter, and that by gradually raising the valves H certain quantities or portions of the water may be caused or allowed to pass down into the receptacle through the pipe D. The water, after passing into the receptacle, will be impregnated with the coagulating material contained therein and be forced up through the opening $d^2$ and pipe F into the filter, the impurities contained in the water being coagulated in the passage of the water thereto. In this receptacle I preferably use as a coagulant sulphate of alumina, alum, or a compound consisting of alum and persulphate or perchloride of iron, or I may use sulphate of iron; but when the latter is employed I prefer to use lime in a separate receptacle as a precipitant; but I do not limit my invention to the use of any special coagulant, or to the ingredients or quantities of the latter, of which the coagulant consists. The above, however, I have found to fully meet in a satisfactory manner all the requirements of the case. The top or cover of the receptacle is provided with an opening through which the coagulant is introduced, said opening being closed by means of the nut $c''$.

It will be noticed by reference to the drawings that I extend the pipe D downwardly to within a short distance of the bottom of the receptacle A. By so doing the water issuing from the said pipe D and passing up through the outlet $d^2$ will be impregnated and combined with the strongest portion of the solution—a result very beneficial in its effect. It will also be noticed that that portion of the chamber B which is midway between the two ends thereof, and at which point is provided means for communication between the chamber and the lower portion of the receptacle, is the most elevated, the purpose of which construction is to allow any air which might find its way into the lower part of the receptacle to collect in that particular part of the receptacle and issue from the opening $d^2$.

My invention is extremely simple in its construction, is efficient in use, doing its work automatically, and, after once being regulated in accordance with the amount of impurities contained in the water, will require no further attention, except as to the refilling with the coagulating material, and, furthermore, can be applied to any or all constructions of filters.

What I claim as my invention, and desire to secure by Letters Patent, is—

1. The combination, with a filter and a supply-pipe leading thereto, of a receptacle having a chamber formed in its upper portion and connected to said pipe for containing the coagulating material, a pipe extending downwardly from said chamber within the receptacle, and a valve for regulating the quantity of water passing through the latter, substantially as set forth.

2. The combination, with a filter and a supply-pipe leading thereto, of a receptacle connected to said pipe for containing the coagulating material, and constructed with a chamber or passage in the upper portion thereof, the latter having openings formed in the lower portion thereof for affording communication between said chamber and receptacle, and a valve for opening and closing said openings, substantially as set forth.

3. The combination, with a filter, of a receptacle for containing the coagulating material and constructed with a passage or chamber in its upper portion, the latter having openings formed in the lower portion thereof, a pipe secured in one of said openings and extending downwardly within the receptacle, a valve located within the chamber above the said openings and adapted to open and close the same, and a supply-pipe leading to the filter and communicating with each end of the said passage, substantially as set forth.

4. The combination, with a filter, of a receptacle formed with a chamber or passage in its upper portion, a nut fitting in the lower wall of the latter and provided with openings leading into the lower portion of said receptacle, and a valve secured to a stem passing through the upper wall of the chamber, said valve being adapted to simultaneously open or close all of said openings leading to the lower part of the receptacle, substantially as set forth.

5. The combination, with a filter, of a receptacle, A, provided with the chamber B, the nuts C $f$, valve H, stem G, lever $g$, plate $h$, and pin $k$, the above parts being combined and adapted to operate substantially in the manner and for the purpose described.

Signed at New York, in the county of New York and State of New York, this 25th day of August, A. D. 1885.

JNO. W. HYATT.

Witnesses:
GEORGE COOK,
HERMAN GUSTOW.